United States Patent [19]

Mellon

[11] 4,336,422
[45] Jun. 22, 1982

[54] TOLL RESTRICTOR

[75] Inventor: Regis B. Mellon, Mulberry, Fla.

[73] Assignee: Akzona Incorporated, Asheville, N.C.

[21] Appl. No.: 75,341

[22] Filed: Sep. 13, 1979

Related U.S. Application Data

[63] Continuation of Ser. No. 922,126, Jul. 5, 1978, abandoned.

[51] Int. Cl.³ .............................................. H04M 1/66
[52] U.S. Cl. ................................................. 179/18 DA
[58] Field of Search .......... 179/18 DA, 189 D, 90 D, 179/18 BE, 18 B, 90 BB, 81 R, 18 D, 27 CB

[56] References Cited

U.S. PATENT DOCUMENTS

| | | | |
|---|---|---|---|
| 3,573,389 | 4/1971 | Greenstein et al. | 179/18 BE X |
| 3,757,055 | 9/1973 | McCann et al. | 179/90 D |
| 3,798,381 | 3/1974 | Piacente et al. | 179/18 DA |
| 3,867,582 | 2/1975 | Weed et al. | 179/18 BE |
| 3,873,781 | 3/1975 | Nissim | 179/18 B X |
| 3,934,095 | 1/1976 | Matthews et al. | 179/18 D |
| 3,985,972 | 10/1976 | Rolin et al. | 179/18 DA |
| 4,007,333 | 2/1977 | Marheine | 179/90 BB X |
| 4,022,983 | 5/1977 | Braun et al. | 179/18 B |
| 4,045,619 | 8/1977 | Harrington | 179/18 DA |
| 4,046,965 | 9/1977 | Kontomerkos | 179/18 DA |
| 4,099,033 | 7/1978 | Murray | 179/90 D |

FOREIGN PATENT DOCUMENTS

| | | |
|---|---|---|
| 1227074 | 10/1966 | Fed. Rep. of Germany ........ 179/18 DA |
| 2165235 | 11/1972 | Fed. Rep. of Germany ... 179/90 BB |

*Primary Examiner*—Thomas W. Brown
*Attorney, Agent, or Firm*—Francis W. Young; David M. Carter

[57] ABSTRACT

There is provided a telephone toll restrictor which is adapted to split the telephone line into two separate circuits for isolating the instrument from the central office during dialing. A dialing tone sensor provides signalling information to a programmed microprocessor which determines whether or not the number is permissible. A pair of filters separate the high and low frequencies of the tone and input this information to the microprocessor. If the dialing tones are permissible, then a generator regenerates the tones and passes the tones to the central office for completing the call. Furthermore, the telephone line is then recoupled and the call is permitted. If the call is not permitted, then a holding bridge, which holds the central office while the microprocessor examines the number, is opened by the microprocessor, causing the central office to time out, thus denying access to the caller.

8 Claims, 3 Drawing Figures

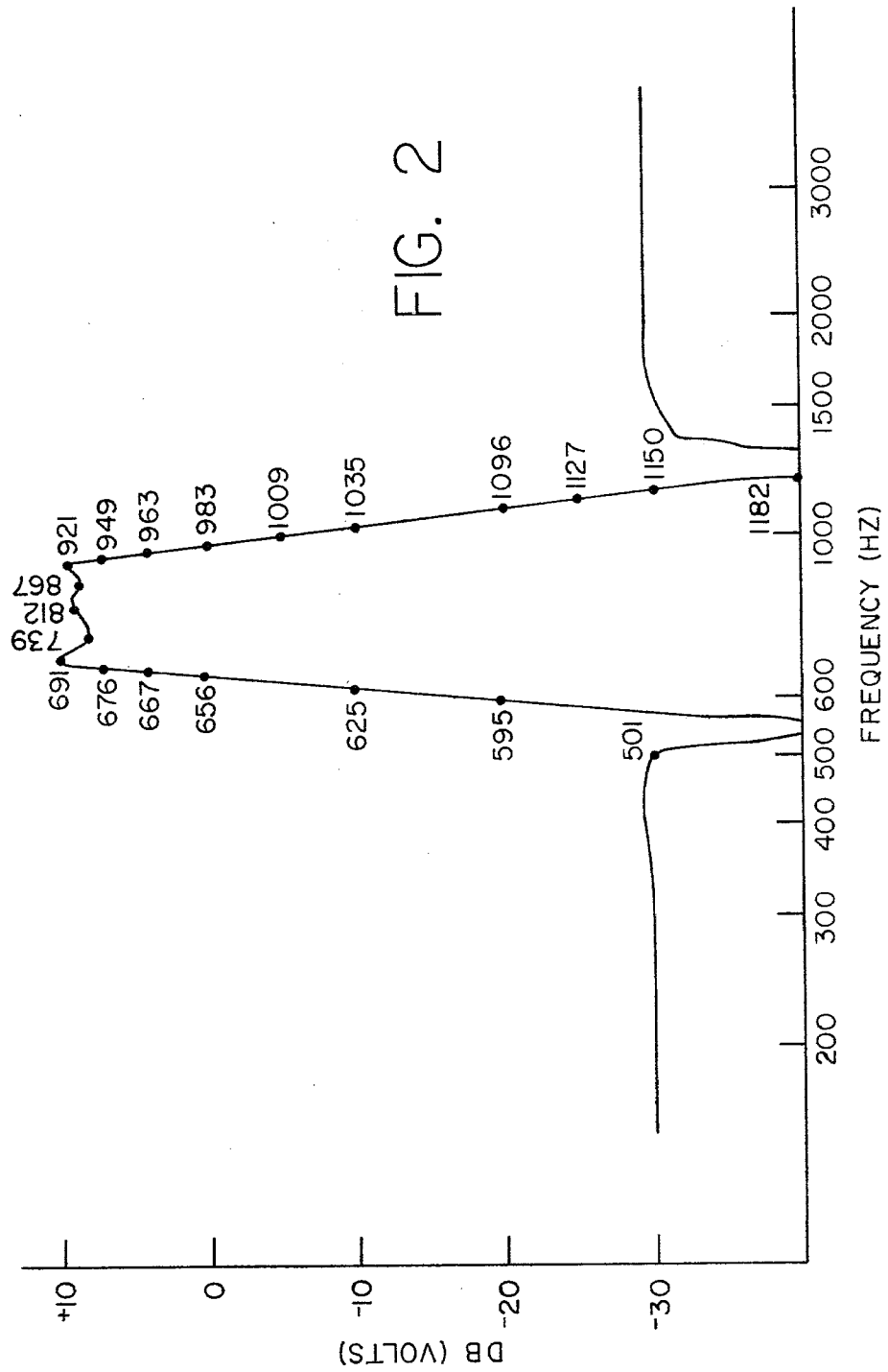

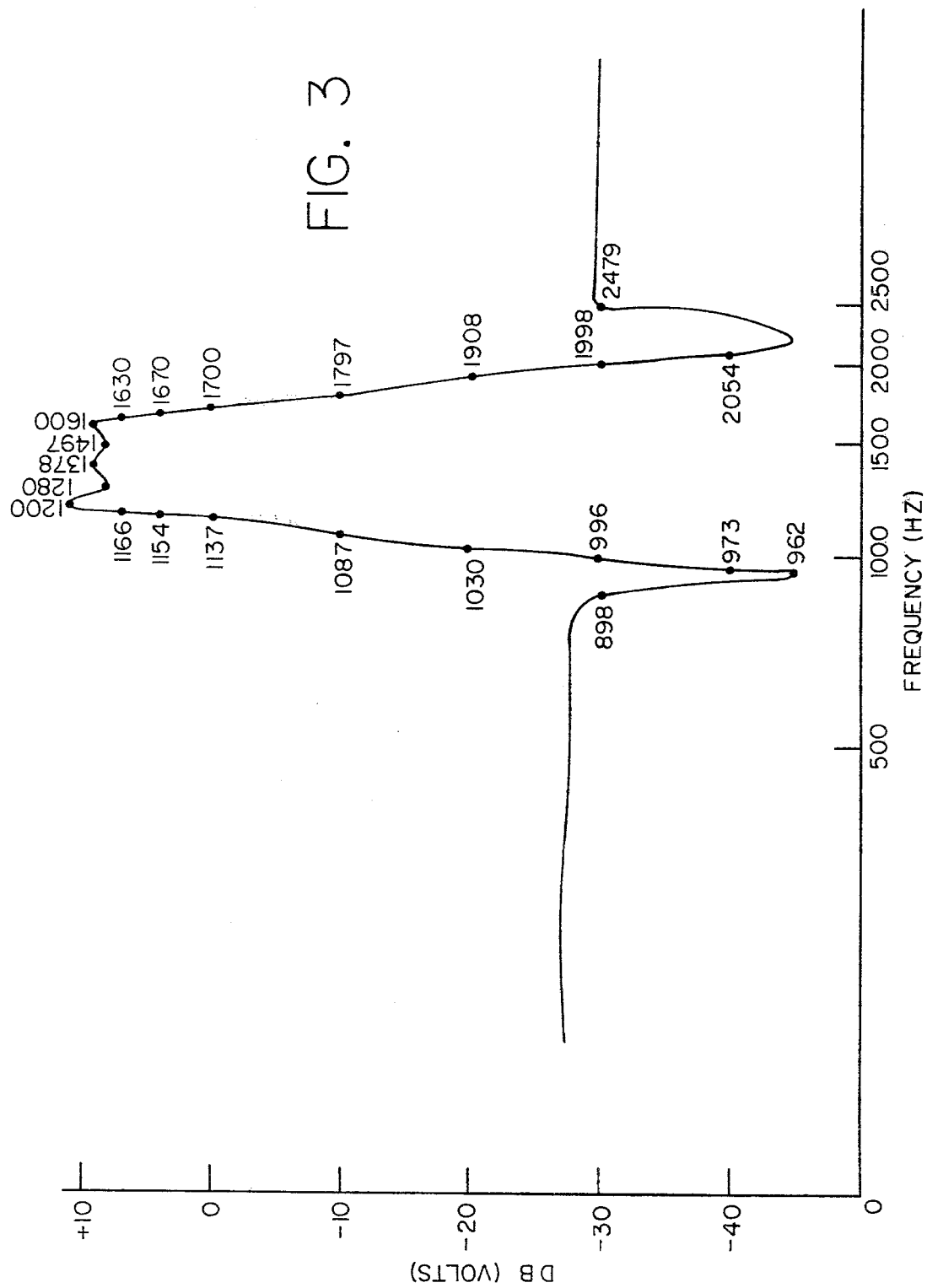

TOLL RESTRICTOR

This is a continuation of application Ser. No. 922,126, filed July 5, 1978, now abandoned.

BACKGROUND OF THE INVENTION

This invention relates to an improved telephone toll restrictor. More particularly, it relates to a telephone toll restrictor which splits the line during examination of tones from an instrument and utilizes a microprocessor for such examinating and for controlling the switches in the toll restrictor.

There have been provided electronic telephone toll restrictors which restrict the user from using the telephone for long distance toll calls. For example, if the number "0" were dialed, or any number of digits greater than "7" were dialed, the call would be automatically aborted by the toll restrictor by opening a switch or grounding either the tip or ring conductors.

Examples of some of prior art toll restrictors are shown in the following list of U.S. patents:

U.S. Pat. No. 3,736,383—issued May 29, 1973
U.S. Pat. No. 3,851,109—issued Nov. 26, 1974
U.S. Pat. No. 3,872,260—issued Mar. 18, 1975
U.S. Pat. No. 3,757,055—issued September, 1973
U.S. Pat. No. 3,920,936—issued Nov. 18, 1975

As can be seen from the above cited patents, most of these prior art toll restrictors provide a circuit in parallel with the telephone instrument with no mechanism for isolating the instrument from the central office. These toll restrictor circuits were preprogrammed to restrict calls based on digits dialed or tones provided from the telephone instrument. The Central Office (C.O.) must use tone receivers on all lines equipped with instruments that generate dialing tones (DTMF). Toll restrictors servicing lines equipped with DTMF instruments must also have a tone receiver. In order to provide a reliable restrictor, it is necessary for both the C.O. and toll restrictor receivers to track exactly for all dialing activity. The receiver at the C.O. and the receiver at the location of the restrictor are not at the same point in the signed path, but indeed may be separated by several miles of cable. Since the recognition characteristics of a receiver are influenced by signal amplitude, twist, background noise phase shifts, clipping, frequency delay, etc., it is not possible to guarantee that two receivers will track when the units are parallel but not at the same location.

Toll restrictors that parallel connect to the system restrict after the fact. Example: with a parallel restrictor, assume that the digit "0" is dialed. The office will receive the digit at the same time and will trunk on it. Once the office receives the digit, it will continue to process the digit. The restrictor, after it recognizes the digit "0", will attempt to restrict the call by opening the line for a period long enough to indicate to the C.O. to drop the call. This process could take as long as one second. Meanwhile, the operator phone is ringing. Should the operator answer before the C.O. times out, the operator will control the switch train and prevent it from timing out. The toll restrictor, when it reconnects to the line, allows the subscriber to get the long distance operator thereby defeating the purpose of the restrictor.

It is therefore desirable to provide an improved telephone toll restrictor which overcomes the disadvantages of the prior art.

OBJECTS OF THE INVENTION

It is therefore one object of this invention to provide an improved telephone toll restrictor which splits the telephone line between the instrument and the central office during analysis of the tones or signals provided from the instrument.

It is another object of the invention to provide an improved telephone toll restrictor which utilizes a microprocessor for receiving and analyzing telephone signals from the instrument and providing information to the remainder of the toll restrictor for either restricting or passing signals through the central office.

It is another object of this invention to provide a telephone toll restrictor which regenerates dialing signals to the central office after receiving signals from the telephone instrument.

It is another object of this invention to provide a telephone toll restrictor which is both reliable and accurate.

SUMMARY OF THE INVENTION

In accordance with one form of this invention, there is provided a telephone toll restrictor circuit for use with a telephone system having a pair of conductors connected between a central office and a telephone instrument. The toll restrictor circuit includes a means for connecting the restrictor circuit to at least one of the conductors. A switch means is connected to at least one of the conductors for opening and closing the connection between the central office and the instrument through the conductors. There is a means for connecting the central office to a holding bridge while a call is being attempted from the instrument.

There is further provided a means for connecting the instrument to an energy source separate from the central office energy source and a means for analyzing from the telephone instrument for permitting or denying a telephone call. In one aspect of this invention, this means for analyzing is a microprocessor.

BRIEF DESCRIPTION OF THE DRAWINGS

The subject matter is regarded as the invention set forth more particularly in the appended claims. The invention itself, however, together with further objects and advantages thereof, may be better understood by referring to the following description taken in conjunction with the accompanying drawings in which:

FIG. 2 is a diagrammatical showing of the frequency response of a low band pass filter utilized herein;

FIG. 3 is a diagrammatical showing of the frequency response of a high band pass filter utilized herein.

DESCRIPTION OF THE PREFERRED EMBODIMENT

Figure 1:
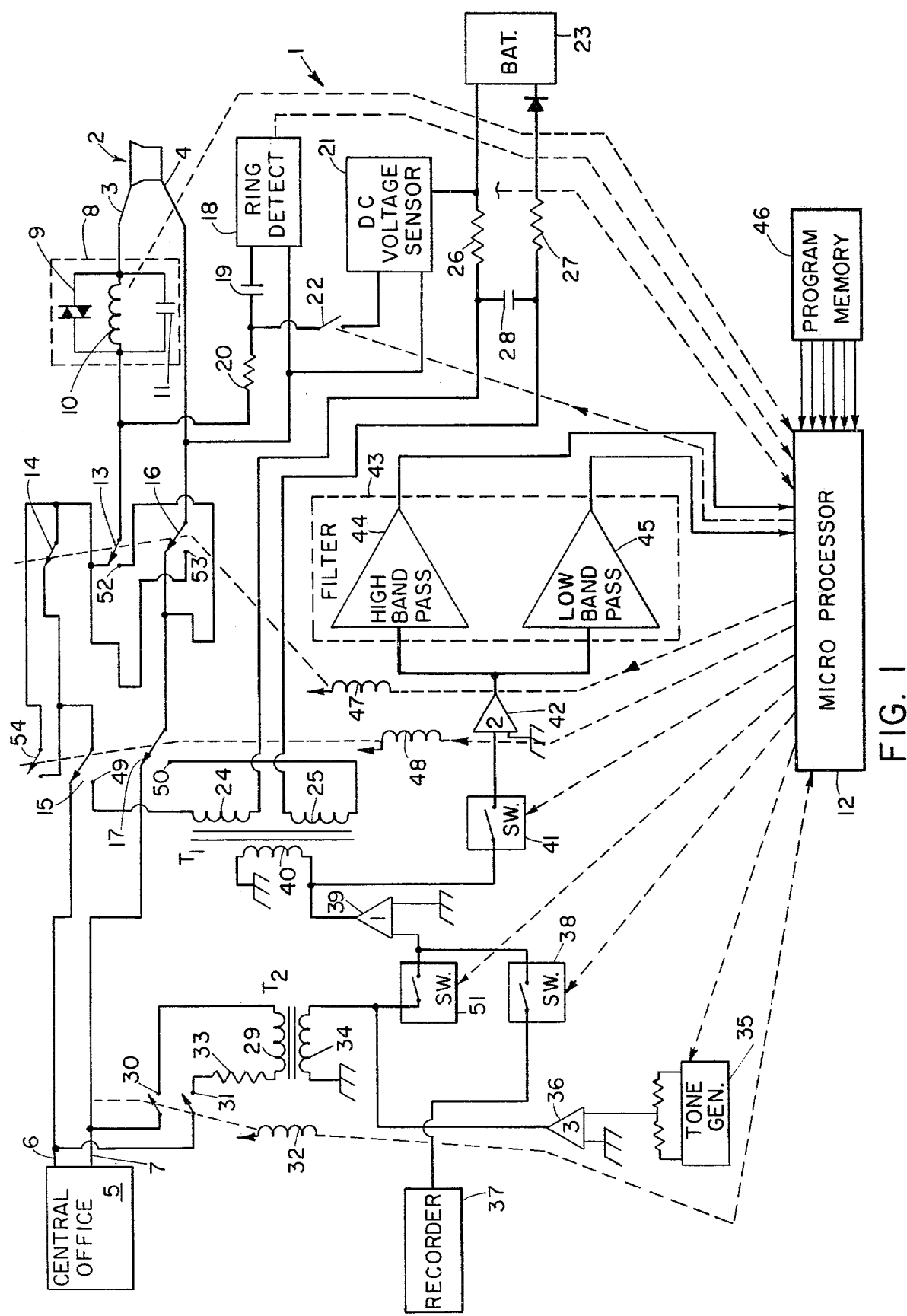
FIG. 1 is a schematic circuit diagram of one form of the improved toll restrictor.

Referring now more particularly to FIG. 1, there is provided an improved toll restrictor circuit 1 adapted to be connected to telephone instrument 2 via instrument tip conductor 3 and instrument ring conductor 4. The toll restrictor 1 is further adapted to be connected to central office 5 via central office tip conductor 6 and ring conductor 7. The instrument tip conductor is connected to current sensor 8. Current sensor 8 includes the parallel circuit of varistor 9, relay coil 10, and capacitor 11. Coil 10 provides current information to microprocessor 12. The other side of current sensor 8 is connected to the central office through switches 13, 14, and 15. The instrument ring conductor 4 is connected to the central office through switches 16 and 17. Ring detector 18 is connected across the instrument tip and ring conductors through capacitor 19 and resistor 20. The ring conductor further provides ring information to the microprocessor 12 to indicate an incoming call. A DC voltage sensor 21 is also connected across the instrument tip and ring conductors, through resistor 20 and switch 22. Switch 22 is controlled by microprocessor 12. Voltage sensor 21 provides voltage pulse dialing information to microprocessor 12 in the event the instrument 2 is a dial type phone.

The dotted line, as shown in FIG. 1, between the microprocessor and other various circuit components, indicates an information channel which may be a hard electrical connection. The arrowheads on the dotted lines indicate the direction of information flow.

Battery 23 provides a local source of DC power for the telephone instrument as well as the remainder of the circuitry in the toll restrictor. The battery is connected to the telephone instrument through the coils 24 and 25 of transformer T1. Resistors 26 and 27 are connected between the battery and the respective coils. A capacitor 28 is connected between these two resistors. These coils 24 and 25 are connected to the instrument through switches 15 and 17. The winding 29 of transformer T2 is connected across the tip and ring central office conductor through switches 30 and 31. Switches 30 and 31 are controlled by relay coil 32, which is further controlled by microprocessor 12. The tip side of the central office line conductor is connected to winding 29 through resistor 33. Transformer T2 includes winding 29 coupled to winding 34. Winding 29 acts as a secondary winding and winding 34 acts as a primary winding when a tone is generated from tone generator 35, which will be explained later.

Tone generator 35 is connected to winding 34 through amplifier 36 and provides a tone to the central office in the event that a call is found to be permissible by the microprocessor. Amplifier 36 is connected to winding 34 which, when the tone generator 35 is in operation, serves as a primary winding to transfer tone signals to the central office. Furthermore, a recorder 37 may be connected to switch 38 which is further connected through amplifier 39 to primary winding 40 of transformer T1 for providing a recorded message to the person attempting to make an unauthorized call on instrument 2.

Transformer T2 also provides a one-way signal path from the central office to the telephone instrument to provide a signal from the central office even while the lines of the instrument and the central office are split. The path is one-way in that amplifier 39 blocks signals from the instrument side to the central office side due to its polarity.

Switch 41 is connected to coil 40 of transformer T1 and is controlled by the microprocessor 12. Switch 41 is further connected to amplifier 42 which amplifies tones received from the telephone instrument 2. The tones received from amplifier 42 are transmitted to filter 43 which includes high band pass filter 44 and low band pass filter 45. These two band pass filters split the signal into its high and low component parts. As is well known, a telephone tone signal consists of a high frequency signal and a low frequency signal mixed together. Thus, the particular number pressed on the tone pad is decipherable by splitting these two signals from each other as accomplished by the high and low band pass filters. The splitting of the tone signal from the instrument pad by high and low band pass filters may be better understood in reference to FIGS. 2 and 3, which show the output band of signals which may be passed by the respective filters. The ordinate shows frequency in hertz and the abscissa shows decibel volts (DBV).

The microprocessor 12, in one embodiment, is an RCA 1802 8 BIT C-MOS Processor having associated RCA 4066 quad bilateral switches and an RCA 4042 quad clocked d-latches and an RCA 1852 I/O device. This microprocessor controls all relays, all electronic switches, as well as the dial tone generator 35. It further monitors loop current sensor and loop voltage sensor 8 and 21. The processor utilizes a program memory 46 for instructions set to accomplish all the tasks necessary to operate the toll restrictor. These tasks, besides those mentioned above, are as follows:

The processor calculates the frequency of the ring signals from the ring signal detector 18. It further analyzes voltage and current sensors to interpret dial tone information. The microprocessor 12 analyzes zero crossings from the high and low band pass filters 44 and 45 to determine what digits are being dialed while providing voice talk-off immunity. During this interval, the processor does statistical correlation tasks. The processor converts the filter out-put to a digital format that is representative of the digits being dialed. The processor then analyzes this digit sequence and determines what type call is being placed and how many tone digits will be associated with the numbers to permit the call.

The circuit set forth in FIG. 1 operates in the following manner:

Instrument on Hook:

When power is removed or when the telephone instrument is on hook, the toll restrictor is transparent. This allows normal telephone usage during power failure. Under the on-hook or power failure conditions, there exists an AC impedance bridge, which is ring detector 18, to monitor ring signals. Ring signal information is passed to the microprocessor 12 from ring detector 18.

Off-Hook (Outgoing Calls):

The current sensor 8 monitors the line for a steady state loop current condition. The toll restrictor will mask out all alternating current from 10 hertz to 1000 hertz regardless of the magnitude of the current. When steady state current is greater than 16 milliamps and flows in the tip and ring conductors 3 and 4 for more than 100 milliseconds, the microprocessor 12 marks the line busy and operates relay coil 32 which in turn closes switches 30 and 31. Furthermore, the microprocessor closes switch 22 which connects the voltage sensor 21 across the tip and ring conductors. Relay contacts 30 and 31 place the primary winding of transformer T2 across the central office tip and ring conductors 6 and 7. Switch 22 removes the ring detector from across the tip and ring on the instrument line and places the DC voltage sensor across the line. The microprocessor 12 energizes coil 48 ten milliseconds after placing the primary winding 29 across the central office line. Winding 48 causes switches 15 and 17 to switch from their position as shown in FIG. 1 to contact points 49 and 50 respectively. The operation of relay contacts 15 and 17 is delayed by 10 milliseconds to prevent an open line condition to the central office, while the relay contacts 30 and 31 are being operated.

A new source of talk battery 23 is connected to the windings 24 and 25. The two sources of loop current, i.e. the source of loop current from the central office and loop current for the instrument, are now isolated from each other and the tip and ring lines are thus split into an instrument tip and ring path and a central office tip and ring path. Thus, at this point, there can be no direct communication from the telephone instrument to the central office through the tip and ring conductors. Therefore, no manipulation of the instrument can cause a call to be transferred immediately to the central office. The current sensor 8 and the voltage sensor 21 are now only servicing the instrument side of the line.

Dialing:

During dialing or tone generation from instrument 2, as detected by the voltage sensor 21, the microprocessor closes switch 51 and switch 41. Switch 51 being closed provides for a one-way path from transformer T2 through one-way electronic amplifier 39 to the primary winding 40 of transformer T1. The amplifier 39 is factory set to just compensate for the losses in the transformers T1 and T2. This one-way path enables the calling subscriber to hear the central office condition, i.e. dial tone, busy, ring back, etc., but no direct communication can be made from the instrument to the central office. In this way, the subscriber or the person on the instrument 2 knows that the phone system is operable.

Switch 41 closes a path from transformer T1 through the one-way electronic amplifier 42 to the high and low band pass filters 44 and 45. Amplifier 42 limits and controls the gain to these filters of the tones originated at the instrument 2. The filters split the pair of tone pulses into high and low frequencies. Again, this is better seen in reference to FIGS. 2 and 3. The output of the filters are square wave frequencies corresponding to the content of the tone pairs. The microprocessor monitors the output of the filters to determine if a legitimate tone pair is being received, and is able to determine the digits being dialed. Voice talk-off is prevented by extensive statistical correlation on the square wave by the microprocessor. If the telephone instrument has a rotary dial, dialing from such a rotary dial is determined by the microprocessor monitoring both the current sensor 8 and the voltage sensor 21 and the filters 44 and 45 are not utilized.

Digit Processing—Local Calls:

The digits, as they are received, are analyzed by the microprocessor to determine if it is a local call or long distance call, and also, whether the call will be three, seven, or eleven digits. On local calls, the microprocessor commands the tone generator 35 to provide a tone pair for 80 milliseconds corresponding to the digit received after it opens switch 51. Switch 51 is opened and remains open only for the 80 millisecond period that generator 35 is on. This is to prevent the regeneration of the tone from being fed through amplifier 39, switch 41, and amplifier 42 to the tone filters. Thus, dialing to the central office by the toll restrictor from the tone generator 35 will always be tone type dialing regardless of whether the originating telephone is equipped with rotary dial or touch tone path. The tone generator signal is amplified by amplifier 36 and the signal is passed through transformer T2 to the central office tip and ring conductors 6 and 7.

Digit Process (Toll Call):

On toll calls, the toll restrictor exercises a restrict cycle. Depending on the type of toll call, the restrict cycle may occur on the first, second, third or fourth digit, in this embodiment. If zero is dialed on the first digit, the restrict cycle occurs immediately without outpulsing the digit to the central office as previously explained. On other calls, the microprocessor orders the outpulsing of digits until enough digits are dialed to determine that it is a toll call, and thus initiates the restrict cycle. The restrict cycle is characterised by the opening of relay contacts 31 and 32 and the movement of switches 13, 14 and 16 from the condition shown in FIG. 1 to contacts 52 in the case of switch 13 and 53 in the case of switch 16, and switch 14 is open. These switches are operated through relay coil 47, and are operated for a period of 300 milliseconds or 1.6 seconds, depending on the programming of the microprocessor. This opens the line back to the central office for that time period and upon release of the relay contacts 13, 14, and 16, the line is reclosed and dial tone is again acquired by return to the central office. Thus, the call is aborted due to the time out of the central office.

Divert Line Mode:

The circuit may also be operated in a divert mode which will connect the circuit to audio recorder 37. The microprocessor operates relays 47 in the manner described above. Switch 38 is closed, thereby closing a path from the recorder 37 to the instrument 2. Thus, the call originator is told that his number dialed is a restricted number.

Completion of Dialing:

The microprocessor must determine how many digits are going to be dialed in order to reconnect the telephone instrument to the central office line. Based on the digits dialed, the microprocessor will effect transfer after it has sent the third, seventh, or eleventh digits in this embodiment. Transfer is characterised by the release of relay contacts 15, 17, and 54. Ten microseconds later, relay 32 opens 30 and 31, and all electronic switches are opened. Relay switch 22 remains closed and the microprocessor continues to monitor the current and voltage condition of the line.

Hang Up:

When the instrument is hung up, all relays are released and all electronic switches are de-energized. The microprocessor goes back onto the on-hook state.

Ring In:

When the telephone instrument 2 is in the on-hook state, the microprocessor is continuously monitoring the ring detector 18. For purposes of noise immunity, the ring detector will only respond to ring frequencies between 16 hertz and 50 hertz. If a ring frequency is detected, followed by an off-hook state, the microprocessor marks the line busy and operates relay 22, thus closing switch 22, to place the voltage sensor 21 across the line. In this case, the telephone instrument 2 does not split from the central office as previously described. The microprocessor's only activities now are to monitor the status of the current detector 8 for the purpose of detecting a hang-up and monitor for dial tone. If dial tone is received, a restrict cycle will be initiated. The program memory 46 may be programmed to permit or deny most any telephone call; however, in normal use, it is programmed to permit local calls and deny toll calls.

The circuit as shown in FIG. 3 has been operated and tested successfully with the following list of components having corresponding values:

LIST OF COMPONENTS AND VALUES

1. T2—Audio transformer—turns ratio 1:1—frequency response 300–3,000 hertz
2. 32-24 volt cradle relay—2PDT (Form C contacts)
3. T1—Repeat coil bifilar wound—turns ratio 1:1:1.—Frequency response 300–3,000 hertz.
4. 11-65 MF 10 volt—Non-polarized capacitor.
5. 10—Form A—Reed Relay—34 R coil±10%.
6. 19-100F Varistor—6 volt.
7. 36-741 Operational amplifier with associated resistors and capacitors.
8. 35-MC14410—2 of 8 tone encoder.
9. 38—¼ RCA 4066 with associated resistors and capacitors.
10. 51—½ RCA 4066 with associated resistors and capacitors.
11. 41—¼ RCA 4066 with associated resistors and capacitors.
12. 42—741 operational amplifier with associated resistors.
13. 44—Active band pass elliptical filter consisting of operational amplifiers, resistors and capacitors.
14. 45—Active band pass elliptical filter consisting of operational amplifiers, resistors and capacitors.
15. 18—Ring detector consists of a 4N37 optical coupler. W04M bridge rectifier, resistors and capacitors.
16. 21—Voltage detector consists of a 4N37 optical coupler, W04M bridge rectifier and resistors.
17. 46—2048×8 Programmed read only memory SY2316
18. 47—24 volt cradle relay 4PDT—Form C.
19. 48—24 volt cradle relay 4PDT—Form C
20. 23-24 volt battery
21. RCA CDP 1802 Microprocessor
22. 33-600 ohm resistor
23. 20-2400 ohm resistor
24. 19-0.33 µF capacitor
25. 11-0.33 µF capacitor
26. 28-0.33 µF capacitor
27. 26-270 ohm resistor
28. 27-270 ohm resistor From the foregoing description of the preferred embodiment of the invention, it will be apparent that many modifications may be made therein. It will be understood, however, that this embodiment of the invention is intended as an exemplification of the invention only and that the invention is not limited thereto. It is to be understood, therefore, that it is intended in the appended claims to cover all such modifications that fall within the true spirit and scope of the invention.

What is claimed is:

1. A telephone circuit for use with a telephone system having a pair of conductors connected between a central office and a telephone instrument, the telephone instrument providing a signal indicative of a telephone number, said circuit comprising: means for connecting said telephone circuit to the conductors; switch means connected to at least one of the conductors for opening and closing the connection between the central office and the instrument; said switch means being closed when dialing signals are generated from the central office but not from the instrument; means for continuously analyzing said signal from the telephone instrument for permitting or denying a telephone call; said switch means being open during the analyzing of said signal from the telephone instrument; a hold circuit connected to said pair of conductors; means for connecting the instrument to an energy source separate from the central office energy source during analyzing of said signals from the instrument; whereby separate circuits are provided for powering the telephone instrument and for holding the connection to the central office for maintaining loop current during such analyzing; means for regenerating a signal which approximates said analyzed signal from the telephone instrument; said means for regenerating being connected to said means for analyzing and to the pair of conductors; said means for regenerating providing a signal to the central office in response to said means for analyzing having permitted a telephone call; said switch means being closed in response to said means for analyzing having permitted a telephone call.

2. A circuit as set forth in claim 1 wherein said means for analyzing includes a microprocessor.

3. A circuit as set forth in claim 2 wherein said means for analyzing further includes a means for separating component parts of a tone signal; said means for separating connected to said microprocessor and to the instrument.

4. A circuit as set forth in claim 3 wherein said means for separating includes a pair of filters.

5. A circuit as set forth in claim 4 wherein said filters include a high band pass filter and a low band pass filter.

6. A circuit as set forth in claim 1 further including a one-way audio path from the central office to the telephone instrument whereby the party on said instrument may know that the central office is operational.

7. A circuit as set forth in claim 1 further including means for transferring signalling information from the instrument to the means for analyzing.

8. A circuit as set forth in claim 7 wherein said means for transferring includes a transformer connected between the means for analyzing and the telephone instrument.

* * * * *